United States Patent Office 3,026,281
Patented Mar. 20, 1962

3,026,281
AQUEOUS COMPOSITION CONTAINING POLYVALENT METAL SALT OF AN ACIDIC COPOLYMER AS A THICKENER
Richard E. Harren, Levittown, and Victor Runowicz, Philadelphia, Pa., assignors to Rohm & Haas Company, Philadelphia, Pa., a corporation of Delaware
No Drawing. Filed Feb. 4, 1957, Ser. No. 637,875
6 Claims. (Cl. 260—29.6)

This invention relates to aqueous synthetic polymer dispersions adapted to be used for coating purposes and especially to pigmented systems of this type used as water-base paints. The invention also concerns methods of preparing such systems.

Aqueous coating systems using casein as the binder have long been known and have been used to form water-base paints. However, the use of casein and related proteinaceous materials in aqueous coating systems has certain disadvantages, one of the most important of which is the tendency to putrefaction and another is the sensitivity of the coatings to water. Because of these properties, if for no other, resort has recently been had to the use of synthetic linear polymers such as polymers of vinyl acetate and of acrylic esters as the binders in such aqueous coating compositions. Various thickening agents have been used to render such aqueous dispersions of the synthetic polymers of suitable viscosity for application either by spraying or brushing. The terms "flow" and "leveling" are qualitative terms which refer to the character of the aqueous system in respect to its ability to be applied as by brushing and to flow in such a manner over the substrate as to avoid excessive showing of brush marks, or to assure a complete absence thereof after drying.

In the making of emulsion polymer coating compositions there are generally two types of thickeners used. One type is a water-soluble polymeric thickener which increases the viscosity of the dispersion by producing a structure due to limited aggregation or flocculation of dispersed particles. Such flocculated systems are pseudoplastic in character in that the will reduce in viscosity on application by brush or roller, but they have the characteristic of building up rapidly in viscosity on cessation of shear so that good flow and leveling are not achieved. In some cases, if a sufficient quantity of a water-soluble polymeric thickener is used, the polymer dispersion can be re-dispersed (from a flocculated condition) so that good flow and leveling can be achieved through the elimination of thixotropic character, but when this is done the coatings that are obtained from the system are water-sensitive.

The second type of thickener generally used includes the so-called "hydrated colloids," such as treated bentonites, which increase the viscosity of the system not by flocculating the dispersed particles but simply by becoming swollen in the presence of water. The viscosity that is obtained is also of thixotropic character with very short recovery time (that is, recovery from a thin system during shearing to a thick system on cessation of shear). The available thickeners usually operate in one of the two ways mentioned above but sometimes they may operate in both ways together. Thus, some naturally-occurring thickeners, such as casein, alginates, or cooked starch, may operate in both ways described hereinabove. In aqueous polymeric systems, good flow and leveling properties are sometimes obtained with such common thickening agents as methyl cellulose. However, in many of the aqueous systems formed with linear polymeric resin binders, the known thickening agents do not provide good flow and leveling. While these latter polymer systems using known thickening agents in the formulation of paints may sometimes provide adequate flow and leveling characteristics for application to textured or rough surfaces where the texture or roughness hides or masks the brush marks or other irregularities of the coatings, nevertheless, on smooth surfaces, these latter resin formulations using the known thickeners show brush marks excessively.

It is an object of the present invention to provide a thickener which is substantially free of aggregating or flocculating action but yet provides a thixotropic character with a reasonably long recovery time so that good flow and leveling are obtained. Another object is to provide a new aqueous coating composition comprising a dispersed water-insoluble linear addition polymers and a thickening agent which has improved flow and leveling qualities whether or not a pigment is employed in the system. It is a further object of the invention to provide an improved aqueous acrylic polymer dispersion having outstanding flow and leveling characteristics. Another object of the invention is to provide aqueous linear polymer dispersions of thixotropic character wherein the recovery time is sufficiently long to provide good flow and leveling. Other objects and advantages of the invention will be apparent from the description hereinafter.

The new aqueous polymer dispersions of the present invention comprise (1) a binder which essentially comprises or consists exclusively of water-insoluble synthetic linear polymeric material, and (2) a thickening agent formed of a certain class of polyanionic material in conjunction with polyvalent metal ions.

Heretofore, in the making of coating compositions of aqueous dispersions of water-insoluble addition polymers, the introduction of polyvalent metal ions has generally been avoided because of the severe loss in stagility such additions caused including increased settling and precipitation, and especially the loss of freeze-thaw stability even when special care is exercized in the choice of emulsifiers. Surprisingly, it has been found that the polyvalent metal ions can be introduced into such aqueous dispersions in large amounts without reducing the stability below practical limits provided the polyanionic material described herein is introduced properly in conjunction with the polyvalent metal. An essential requirement is that the polyanion be introduced into the dispersion in the form of a water-soluble or self-dispersible salt; otherwise, no appreciable thickening is obtained in the presence of the polyvalent metal ion. The polyanion must also be within a certain molecular weight range, sufficiently high to result in a marked thickening action in the aqueous system and yet not so high as to be precipitated as distinct particles or agglomerates by the polyvalent metal ion. The molecular weight is selected to provide for the formation of a gelatinous polyvalent metal salt of the polyanion in the aqueous phase of the system that is of essentially continuous character.

The polyanionic material, which for convenience may be called a polyanion, is a water-soluble salt, such as an ammonium or an alkali metal salt, of a polymeric compound of either addition or condensation type containing a plurality of sulfuric acid, sulfonic acid, or carboxylic acid groups. In conjunction with a polyvalent metal ion, the polyanion thickens the aqueous system without aggregating or flocculating the dispersed particles, such as of the binder polymer, the pigment when present, and so on. The polyanion contains sufficient acid groups to become soluble in water when at least partially neutralized by ammonium hydroxide, an alkali metal base, or a water-soluble amine, such as methylamine, diethylamine, triethylamine, monoethanolamine, etc. It is believed that the polyvalent metal ion forms a salt with the polyanion which then forms a hydrated swollen colloid, but it is not intended that the invention be limited by this or any other theory of operation. It has been found essential that the molecular weight of the polyanion should be between about 350 and 35,000 (viscosity average) and is preferably in the portion of that range from about 1000 to about 5000. The molecular weight is extremely important in that if the polyanion has substantially greater molecular weight than the upper limit of 35,000, little or no improvement in flow and leveling quality is obtained.

The polyanion may be that of the polymer obtained by the copolymerization of an $\alpha,\beta$-unsaturated carboxylic acid having a single point of monoethylenic unsaturation or a salt of such an acid with another monoethylenically unsaturated polymerizable compound which normally would produce an insoluble homopolymer. The proportion of acid-containing units in the copolymer should be from about 40 to about 60 mole percent in order to provide adequate solubility of the copolymer in the form of its sodium, potassium, lithium or other alkali metal salt. Examples of the acid that may be thus copolymerized include acrylic acid, methacrylic acid, itaconic acid, maleic acid, maleic anhydride, and fumaric acid. Examples of the monomers that can be copolymerized therewith include styrene, vinyl toluene, isobutylene, diisobutylene of the formula $H_3CC(CH_3)_2CH_2C(CH_3)=CH_2$, isoamylene, branched-chain hexenes, dipentene, limonene, terpineol, dicyclopentadiene, esters of any of the acids mentioned above and especially the esters thereof having from 1 to 18 carbon atoms in the alkyl group, such as the methyl, ethyl, butyl, t-octyl and octadecyl esters of acrylic acid or methacrylic acid (which acid may be represented by the formula

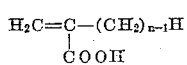

in which $n$ is an integer having a value of 1 to 2) or itaconic acid, acrylonitrile, methacrylonitrile, vinyl acetate, vinyl chloride, vinylidene chloride or mixtures of two or more of such comonomers.

The salts may be formed by the neutralization of maleic anhydride copolymers with aqueous ammonia or an alkali metal base. Since neutralization (at room temperature up to 50° C. or even up to about 70° C.) of the maleic anhydride copolymers with ammonia produces both ammonium salt groups and amide groups in proportions corresponding substantially to the proportions in which such groups would be present in the half salt of the half amide of the copolymer, the ammonium salts of the present invention may be herein designated as an ammonium salt even though the copolymer contains a proportion of the amide groups which varies more or less from the strict amount that would theoretically be present if all of the units in the polymer derived from maleic anhydride were converted to monoamide units. Reference herein to the amonium salt of the copolymer of maleic anhydride is intended to include the salt of the half amide or maleamic acid copolymer which is actually formed.

The polyanion may also be that of lignin sulfonates having the proper molecular weight defined above. The polyanion may be that of a formaldehyde condensation product of a naphthalene-sulfonic acid or of a lower alkyl-substituted naphthalene sulfonic acid in which the alkyl substitution comprises from 1 to 9 carbon atoms, examples being methyl, ethyl, isopropyl, butyl, hexyl, n-octyl, t-octyl (derived from diisobutylene), dodecyl, nonyl (derived from triisopropylene), and so on. The product provides a plurality of sulfonic acid groups sufficient to confer water-solubility on the ammonium, alkali metal or ammonium-half amide salts and the number of aryl nuclei connected by methylene bridges is sufficient to provide a molecular weight of at least 350. These polyanionic materials may be made by known procedures such as by condensing formaldehyde with naphthalene-sulfonic acid or an alkylnaphthalene-sulfonic acid or by the methods described in U.S. Patents 898,307 and 1,336,759. The polyanion may also be that of the sulfation or sulfonation or mixed sulfation-sulfonation product of a condensation product of ethylene oxide with the condensation products of formaldehyde with an alkyl-substituted phenol, $\alpha$-naphthol, or $\beta$-naphthol in which the alkyl substitution may comprise from 1 to 24 carbon atoms, examples being methyl, ethyl, isopropyl, butyl, hexyl, n-octyl, t-octyl (derived from triisopropylene), decyl, dodecyl including lauryl and t-dodecyl (derived from triisobutylene), hexadecyl, octadecyl, and so on, the polyanionic material in this case also having a molecular weight within the range specified and having a plurality of sulfate or sulfonate units sufficient to render the ammonium, alkali metal or amine salts water soluble. The products of this type include those of U.S. Patents 2,454,542–3. The polyanion may also be that of the esterification product of a polycarboxylic acid, and preferably a dibasic acid, such as succinic, glutaric, adipic, phthalic, and maleic, with the ethylene oxide condensation products just mentioned. The products of this type include those of U.S. Patent 2,454,544. The polyanion may also be that of the hydrolysis product of the $\beta$-cyanoethyl ethers obtained by the reaction of acrylonitrile with the ethylene oxide condensation products mentioned above. The products of this type include those of U.S. Patent 2,454,545.

The following three formulas illustrate some of the compounds generally described above which may be used to provide the polyanions of the present invention:

(I) 

(II) 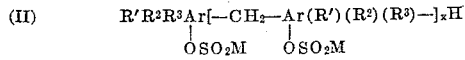

(III) 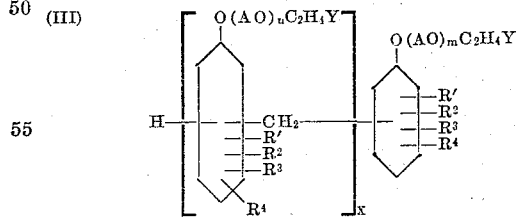

where:

Ar is a benzene or naphthalene nucleus,

R' is a hydrocarbon substituent of at least 4 carbon atoms, and preferably of 8 to 18 carbon atoms, $R^2$ is H or a hydrocarbon substituent of 1 to 18 carbon atoms, $R^3$ is H or a hydrocarbon substituent of 1 to 18 carbon atoms, $R^4$ is H or a hydrocarbon substituent of 1 to 18 carbon atoms, A is an alkylene group of 2 to 4 carbon atoms and preferably ethylene, Y is $-SO_3M$, $-COOM$, or $-OCO-R^6(COOM)_z$, where M is $NH_4$ or an alkali metal and $R^6$ is an alkyl or aryl radical of 1 to 7 carbon atoms, $m$ is 0 or an integer from 1 to 20,
$n$ is 0 or an integer from 1 to 20,
$x$ is an integer having a value of 2 to 5 or more, and
$y$ is 3 to 5.

Outstanding results are obtained when the sodium, ammonium, or other alkali metal salt of the copolymer of maleic acid or its anhydride with diisobutylene is employed to provide the polyanion.

The polyvalent cations that may be introduced are those of calcium, magnesium, barium, strontium, cadmium, copper, mercury, zinc, chromium, and aluminum. These cations may be introduced by the addition of a sufficiently soluble salt of the polyvalent metal. For example, zinc may be introduced as the zinc acetate, chloride, nitrate, or sulfate, salt; calcium may be introduced as the chloride or sulfate; barium as well as all of the others may be introduced as the chlorides or nitrates. If the hydroxides of the metals are sufficiently soluble, the polyvalent cation may be introduced by means of the hydroxide and, when the oxide is sufficiently soluble, the oxide may be used. Calcium oxide is sufficiently soluble to be used with both acid and basic dispersions; magnesium oxide and zinc oxide are not sufficiently soluble to be used in alkaline dispersions, but may be used with dispersions having a pH substantially below 7, such as 6.5 or less.

It has been found that the improved flow and leveling of the present invention is obtained generally with aqueous dispersions of water-insoluble synthetic linear addition polymers. Such polymer dispersions are generally obtained by the emulsion polymerization of polymerizable materials, especially those of monoethylenically unsaturated character, though butadiene, isoprene, and chlorobutadiene may be used to some extent. Examples of the polymerizable materials include all of the comonomers that were mentioned above for making the polyanion. Dispersions obtained by the emulsion copolymerization of any two or more of these monomeric materials are suitable, provided the copolymer obtained is of water-insoluble character. The polymer used as the binder may also contain a small proportion of units derived from monomers which normally produce soluble homopolymers. Thus, they may contain from about ¼% up to 3% of any one or more of such water-soluble polymer-forming materials as acrylamide, any of the acids mentioned above, such as acrylic acid, methacrylic acid, itaconic acid or maleic acid. Specific examples of polymer binders that may be formed by emulsion polymerization to provide the major part of the aqueous coating composition include polyvinyl acetate, polyvinyl chloride, copolymers of polyvinyl acetate with polyvinyl chloride and acrylonitrile, copolymers of vinyl chloride with acrylonitrile or vinylidene chloride, polyethylene, polyisobutylene, copolymers of styrene with butadiene, copolymers of butadiene with acrylonitrile, copolymers of acrylic esters with each other, such as copolymers of ethyl acrylate with methyl methacrylate and any of the copolymers disclosed in U.S. Patent 2,760,886. The addition polymers here involved are those obtained by what may be generically termed "vinyl addition" or "vinyl polymerization" since the polymers result from the reaction at the points of unsaturation to yield an essentially saturated linear polymer chain. For the purpose of the present invention, the polymer used as the binder may have any value of $T_i$ from —50° C. up to about 40° C. when application is to be made at usual conditions of temperature which may be from about 0° C. to about 35° C. or so. The higher the temperature of application, the higher the $T_i$ may be in the range cited above. For some special applications, where the application of the coating material to the substrate is effected at unusually high temperatures, higher values of $T_i$ up to 60° C. or more may be employed. For most practical purposes, however, it is preferred that the $T_i$ value is no higher than some point in the range from 20° to 35° C.

One or more plasticizers for the binder polymer may be present in an amount from about 1 to 20% or more by weight of the binder, 5 to 20% being a preferred proportion, when plasticizer is used. Such plasticizer facilitates coalescence of the polymer particles into a continuous film, especially when application is made at temperatures which are low as compared to the $T_i$ of the polymer used. Examples of plasticizers include butoxyethoxyethyl acetate, dinonyl phthalate, dioctyl phthalate, dibutyl phthalate, triphenyl phosphate, 2-ethyl hexyl benzyl phthalate and dicyclohexyl phthalate. Other well-known plasticizers for polymers of methyl methacrylate which may be employed includes diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethyl hexyl ester of hexamethylene diphthalate, and di(methylcyclohexyl) phthalate. About 2 to 5%, on the total weight of the aqueous dispersion, of ethylene glycol, diethylene glycol or the monoalkyl ethers of diethylene glycol in which the alkyl group has 1 to 4 carbon atoms may be included to assure freeze-thaw stability, especially when plasticizers are included.

The $T_i$ value referred to is the transition temperature or inflection temperature which is found by plotting the modulus of rigidity against temperature. A convenient method for determining modulus of rigidity and transition temperature is described by I. Williamson, British Plastics, 23, 87–90, 102 (September 1950). The $T_i$ value here used is that determined at 300 kg./cm².

In the production of the polymer dispersion by emulsion polymerization procedures, a non-cationic emulsifier may be used. Any non-ionic emulsifier may be employed but when an anionic emulsifier is used, it should be selected so that the addition of the polyvalent metal ions does not cause precipitation or coagulation of the polymer or it should be used in conjunction with a non-ionic emulsifier in sufficient amount to prevent such coagulation.

Typical non-ionic emulsifiers include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long chain carboxylic acids, such as lauric, myristic, palmitic, oleic, and the like or mixtures of acids such as found in tall oil; ethylene oxide condensates of long-chained alcohols, such as octyl, decyl, lauryl or cetyl alcohols, ethylene oxide derivatives of etherified or esterified polyhydroxy compounds having a hydrophobic hydrocarbon chain, etc.

Typical anionic emulsifiers include any of the compounds of Formulas I, II, and III hereinabove and also the alkali metal salts of higher fatty alcohol sulfates having 8 to 18 or more carbon atoms.

The amounts of emulsifier or emulsifiers required vary primarily with the concentration of monomers to be handled and to a minor extent with choice of emulsifier, monomers, and proportions of monomer. Generally, the amount of emulsifying agent is between 2 and 12% of the weight of the mixture of monomers and is preferably 4 to 7% of this weight. If the dispersion is to contain a relatively low concentration of interpolymer somewhat more than the minimum emulsifying agent indicated by the above rule may prove desirable. In such case, the concentration of emulsifying agent in the aqueous solution may desirably be at least 1% of this solution and may be as much as about 7% of the weight of the aqueous solution thereof.

The concentration of the emulsion polymer used as the binder within the aqueous coating system may vary from about 10% to 60%, but is preferably in the range of about 15 to 55% by weight. The amount of the water-soluble salt of the polyanion that may be added may vary from about ½ to 10% on the weight of the aqueous phase in the system, and is preferably about 1½ to 5% of the aqueous phase. The "aqueous phase" here refers to the water and any water-soluble solvent, such as the glycol, used, but excludes any solid material dissolved or dispersed therein. The amount of the polyvalent cation may vary widely and may be equal to, greater than, or less than the amount that is stoichiometrically equivalent to the sulfonic acid or carboxylic acid units of the polyanion. It is not necessary that the full equivalent be used. An excess of the polyanion or of the polyvalent metal cation may be present so that the amount of the polyvalent cation may be anywhere from ⅕ up to about 2½ times the amount that is equivalent to the amount of polyanion present. Generally, if a small proportion of the water-soluble salt of the polyanion is used (based on the aqueous phase), the amount of polyvalent metal ion should be in the higher part of its range, whereas if there is present a large proportion of the water-soluble salt of the polyanion, the amount of polyvalent metal cation may be in the lower part of its range. A larger excess of the polyvalent metal cation than mentioned above may be present, but it is preferred to avoid such an excess in order to avoid undesirable sensitivity to water and heat.

The order of introduction of the polyanion and the polyvalent metal cation is not in general a critical matter though, in some specific instances, it may be more feasible to add one ahead of the other, whereas in others it might be preferable to add the latter before the former. It is believed that the polyvalent cation forms a salt with the polyanion which is of such a character that the polyanion is cross-linked by the cation. When higher concentrations of the polyanion and cation are employed, such as in the upper half of the range hereinbefore specified, a thixotropic system is frequently formed so that on standing the aqueous coating composition has a gel-like character, but on stirring it becomes quite fluid and is easily applied. The thixotropic systems have the additional advantages normally associated therewith in that it is easier to pick up a greater quantity of the composition on each dip of a brush. Also, the thixotropy assists in the sealing of pores and gaps in the surface being coated without interfering with the good flow and leveling qualities of the system. In fact, it appears that the thixotropic systems exhibit even better flow and leveling qualities than those which are not thixotropic.

When the polyvalent metal cation forms a water-dispersible salt with the polyanion, that is, a salt which is either water-soluble or self-dispersible, it has been found that an aqueous dispersion of the polyvalent metal salt of the polyanion may be formed before the introduction into the aqueous system to be thickened therewith and essentially the same benefits of improved flow and leveling are obtained as would be obtained by the introduction into the aqueous polymer suspension of the polyanion and of the cation separately.

When the polyvalent metal cation is added, the pH of the aqueous polymer dispersion may be lowered. It is often desirable, as in systems in which the copolymer contains a small amount of carboxyl groups, that the dispersion should have a pH of at least 9.0, such as from 9.0 up to about 11.5, and the preferred range is from 9.0 to 9.5, in order to have practical stability, especially against freeze-thaw cycles. In such cases, whenever the addition of the polyvalent metal causes the pH to go below about 9.0, an alkaline material should be added to compensate for this reduction of pH to restore it at least to a value of 9.0 or to any higher value desired. Suitable alkaline materials for this purpose include alkali metal or ammonium hydroxides or carbonates. The adjustment of pH in any of the dispersions by means of these alkaline materials provides an additional way of modifying the system in respect to viscosity.

While the aqueous coating composition formulated from the emulsion polymer dispersion, the polyanion and the polyvalent metal cation may be employed directly as a coating composition without the introduction of pigments, and the improved leveling and flow properties are obtained in such systems, the more general practice and the preferred procedure is to incorporate pigments to provide a water-base paint of predetermined color. The pigment may be used in a proportion such that the ratio between pigment and binder is from 0.2:1 to 8:1 and is preferably from about 1:2 to 4:1.

Pigments suitable for use according to the invention are inorganic pigments, such as, for example, chrome yellows, Prussian blues, and Brunswick greens, titanium pigments, such as titanium dioxide, extended titanium pigments (extended with either precipitated or natural extenders, such as calcium carbonate, alkaline earth sulfates, for instance, calcium sulfate, barium sulfate and the like), tinted titanium pigments, titanates such as barium, zinc, lead, magnesium titanates, and the like. Additionally, other types of inorganic pigments may be included, such as zinc sulfide pigments, for instance, zinc sulfide, lithopone, other extended zinc sulfide pigments, such as calcium base lithopone, zinc sulfide, extended with natural extenders, and the like; zinc oxide and antimony oxide, or organic pigments, that is organic coloring matters which are devoid of sulfonic, carboxylic or other water-solubilizing groups. Also for the purposes of this invention, we include within the term "pigment" other water-insoluble organic coloring matters such as, for example, the calcium or barium lakes of azo lake dyestuffs. In some cases, of which calcium sulfate is an example, a pigment or etxender may be used which has a low solubility but is sufficiently soluble to provide the necessary amount of polyvalent metal ions to form a salt with the polyanion which serves to provide the improved flow and leveling characteristics, as well as serving as a pigment and/or as an extender.

In preparing the pigmented compositions of the present invention, the pigment may be introduced into the aqueous copolymer dispersion in various ways. It may simply be added in dry, finely divided form to the copolymer dispersion with stirring and/or more or less grinding or milling action, the addition being preferably made gradually. This procedure is generally most suitable with high speed mixers, blenders or mills when the copolymer dispersion is relatively dilute, of the order of 10 to 20% solids concentration without the pigment. Dispersing agents of non-ionic or anionic types or a mixture of both types should be present in the dispersion, or added thereto, before, during, or after the pigment addition, in adequate amount to maintain the copolymer in dispersed condition and also to disperse the pigment added. However, in most instances, it is preferred to disperse the pigment or pigments in a small amount of water with one or more dispersing agents of the types just mentioned before combining the pigment with the copolymer dispersion. This may be effected by adding the pigment gradually to the small amount of water (to which the dispersing agent or agents have been added or are simultaneously added with the pigment) while merely stirring during the addition or with a certain amount of grinding or milling, depending on the ease of dispersibility of the pigment. Part of the water may be added during the addition of the pgment and/or part may be added after the pigment has been added. Then the pigment dispersion may be combined with the copolymer dispersion by adding either one to the other, preferably gradually, while stirring, and, if necessary, grinding or milling. Whichever procedure is employed, when several pigments are to be mixed in, they may be added as a dry mixture or separately in any order desired. Titanium dioxide and many colored pigments demand more water than others and this is especially true of extenders, examples of which include barium sulfate, lithopone, calcium carbonate, and basic lead carbonate. When forming highly concentrated pastes or dispersions of mixtures of pigments one or more of which have relatively high water demand and one or more others of which have relatively low water demand, it is sometimes found that selection of a particular order of addition facitates dispersion and provides a more permanently dispersed pigment in the final pigmented copolymer dispersion. For example, in some cases, it may be desirable to add the high water demand pigment or pigments first or after only a portion of the low water demand pigment or pigments have been added so that the completion of the addition of the high water demand pigment to the aqueous medium is accomplished before its consistency or viscosity is markedly increased. The addition of the low water demand pigment or remainder thereof is then made.

As the emulsifier used in making the polymer dispersion, the ammonium or alkali metal salt of any of the polyanions mentioned hereinabove may be employed to the exclusion of any other emulsifier or in addition thereto, such as in addition to a non-ionic type. Depending upon the amount of such emulsifier used and the final dilution of the coating system, additional polyanion may or may not be needed to provide the amount necessary to impart the improved flow and leveling in conjunction with the polyvalent cation. Likewise, the ammonium or alkali metal salt of the polyanions mentioned above may be employed as the dispersing agent for the pigments. In the latter case, the polyanion may be introduced into the aqueous polymer dispersion simultaneously with the pigment dispersed therewith. Again, it may or may not be necessary to add more of the polyanion later to provide the improved flow and leveling.

Various auxiliary materials may also be used in preparing the aqueous dispersions of the present invention. These include dispersing agents for dispersing and maintaining in a finely divided state the pigments, colors, or extenders, such as any suitable commercial dispersing agents which are available for this purpose; wetting agents of non-cationic character, and especially such non-ionic types as are described hereinabove as emulsifying agents for the monomers and in the emulsion polymerization procedures: defoaming agents, including waxes, oils, mineral spirits, alkylphenoxyethanols, fatty acid amides, phosphate esters, or a solution of an amine or amide in an oil; humectants, such as water-soluble gums, ammonium or sodium polyacrylate of high molecular weight, glycol laurate, propylene glycol, diethylene glycol, etc.; auxiliary thickeners, such as water-soluble gums, water-soluble polyacrylates and methacrylates of high molecular weight, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed forms, such as alkyd resins, drying oils, coumarone-indene resins, natural resins, such as copals, to cheapen and extend the binders of this invention, and auxiliary corrosion-inhibiting agents, such as sodium benzoate, sodium dichromate, guanyl urea phosphate, or sodium nitrite, in an amount of 0.05% to 5%, and most commonly 0.1% to 2% of the dispersed copolymer, etc.

The coating compositions of the present invention may be applied to any suitable substrate, whether it has been painted previously or not and whether or not it is porous or non-porous. Such substrates include wood, plaster, stone, and other masonry, cement blocks, asbestos cement products such as shingles, gypsum board, corkboard, fibrous materials, such as wall and ceiling tile, acoustic tile of either organic, fibrous, or inorganic types, ceramics, glass, metals, such as steel, aluminum, chromium, silver, paper, cardboard, chipboard, strawboard, and textiles.

In the following examples which are illustrative of the invention, the parts and percentages are by weight unless otherwise noted:

*Example 1*

Seven water-base paints are prepared by mixing in a pony mixer the following ingredients in the order listed:

|  | Pounds | | | | | | |
| --- | --- | --- | --- | --- | --- | --- | --- |
|  | A | B | C | D | E | F | G |
| Polyanion Solution ¹ | 18 | 36 | 27 | 27 | 27 | 54 | 27 |
| Defoaming agent (waxy hydrocarbon-Balab 588) | 2 | 2 | 2 | 2 | 2 | 2 | 2 |
| 28% Aqueous NH₄OH | 5 | 5 | 5 | 5 | 5 | ---- | 5 |
| Methyl ether of t-octylphenoxypolyethoxyethanol | 6 | 6 | 6 | 6 | 6 | 6 | 6 |
| Water | ³73 | ³73 | 28 | 28 | 28 | 40 | 28 |
| Rutile TiO₂ | 225 | 225 | 225 | 225 | 225 | 225 | 225 |
| Calcium carbonate | 225 | 225 | 225 | 225 | 225 | 250 | 225 |
| Diatomaceous silica | ---- | ---- | ---- | ---- | ---- | 25 | ---- |
| Ethylene glycol | 30 | 30 | 35 | 35 | 35 | 30 | 35 |
| Butoxyethoxyethyl acetate | 10 | 10 | 10 | 10 | 10 | 1 | 10 |
| Phenyl mercuric acetate | 1 | 1 | 1 | 1 | 1 | ---- | 1 |

After pony mixing thirty minutes, there are added with continued mixing in the order listed, the CaCl₂ being added slowly:

| Water | ---- | ---- | 47 | 47 | 47 | 120 | 47 |
| --- | --- | --- | --- | --- | --- | --- | --- |
| Aqueous Polymer Dispersion ² | 375 | 375 | 375 | 375 | 375 | 340 | 375 |
| Defoamer (50% Balab 588) | 4 | 4 | 4 | 4 | 4 | 4 | 4 |
| CaCl₂ (10% in water) | 45 | 96.5 | 101 | 60 | 75 | 90 | ---- |
| 10% solution in water of same sodium salt of maleic anhydride copolymer above | ---- | 135 | ---- | 22.5 | 45 | ---- | ---- |
| 28% aqueous NH₄OH | ---- | ---- | ---- | 5 | 4.2 | 12 | ---- |

¹ 25% solution in water of the sodium salt of an approximately 1:1 mole ratio copolymer of diisobutylene and maleic anhydride (visc. ave. mol. wt. 2000–4500).
² Aqueous dispersion of about 43% of a copolymer of about 66% ethyl acrylate, about 32.5% methyl methacrylate, and about 1.5% acrylic acid containing about 3% t-octylphenoxypolyethoxyethanol and neutralized to a pH of about 9 with NH₄OH.
³ In making A and B, a portion of the water may be withheld and added after pony mixing as in the other formulations.

The properties of the seven paints are as follows:

|  | A | B | C | D | E | F | G |
|---|---|---|---|---|---|---|---|
| pH | 9.3 | >9.0 | 9.5 | 9.5 | 9.5 | 9.4 | 9.2 |
| Viscosity (Krebs units) | 65 (Light thixotropic gel.) | Extremely thix. stiff gel. | 68 Light thix. gel. | 67 Light thix. gel. | 70 Light thix. gel. | >80 to 65 Extremely thixotropic. | 64 |
| Ratio CaCl₂/maleic copolymer salt | 1:1 | 3:7 | 6:4 | 4:6 | 4:6 | 4:6 | -------- |
| Ratio Water/sum of CaCl₂ and maleic copolymer salt | 97.7:2.3 | 94.5:5.5 | 96.3:3.7 | 96.6:3.4 | 96.1:3.9 | 96:4 | -------- |
| Solids (percent by weight) | 62 | 54 | 59 | 60 | 58.5 | 77 | 64 |
| Pigment Volume Conc. (percent) | 47 | 47 | 47 | 47 | 47 | 52.5 | 47 |

Paint G which lacks the polyvalent cation has high solids, relatively low viscosity and very short wet-edge or brushing time. When the usual synthetic polymeric thickening agents are added to G in an attempt to improve brushing properties, it is found that the wet-edge time is only slightly increased but the flow and leveling is seriously impaired.

Paint F has a moderately stiff gel structure which breaks down readily upon brushing or roller-coating to give excellent flow and leveling and wet-edge time.

All of the above formulations except G are thixotropic systems which form reversible gelled structures on standing. All except G exhibit excellent flow and leveling when applied by brush or roller as well as considerably longer "wet-edge" time than the paints prepared with conventional polymeric thickeners.

All paints have excellent scrub resistance and are stable for at least one freeze-thaw cycle.

*Example 2*

The following materials were mixed together in the order listed in a pony mixer:

| | Pounds |
|---|---|
| Defoamer (Balab 588) | 2 |
| NH₄OH (28%) | 5 |
| Water | 200 |
| Methyl ether of t-octylphenoxypolyethoxyethanol | 6 |
| Polyanion solution ¹ | 36 |
| Hydrolyzed polyacrylonitrile (6% in water) | 50 |
| Rutile TiO₂ | 225 |
| Calcium sulfate | 225 |
| Diatomaceous silica | 25 |
| Calcium carbonate | 75 |

¹ 25% aqueous solution of sodium salt of 1:1 mole ratio copolymer of diisobutylene and maleic anhydride (visc. ave. mol. wt. 2000–4500).

The calcium sulfate provides the polyvalent metal cation. The mixture is given one pass through a 3-roll mill and there are then mixed into the batch, in the order listed, the following:

| | |
|---|---|
| Aqueous polymer dispersion ² | 350 |
| Defoamer as above (50% solution in water) | 8 |
| Ethylene glycol | 30 |
| Phenyl mercuric acetate | 2 |

² 43% aqueous dispersion of ammonium salt of a copolymer of about 66% ethyl acrylate, 32.5% methyl methacrylate, and about 1.5% acrylic acid containing about 3% of t-octylphenoxypolyethoxyethanol, pH=9.

Thereby 100 gallons of a white water-base paint is obtained having the following properties:

| | |
|---|---|
| pH | 9.3 |
| Visc. (Krebs units) | 67 |
| Pigment vol. con | 53% |
| Solids | 58% |
| Freeze-thaw | At least 2 cycles |

The paint has excellent flow and leveling on brush and roller application. The film has at least 1000 cycles of scrub resistance (Gardner Scrub Test).

An extremely thixotropic gel, which is still reversible, is obtained when additional sodium salt of 1:1 mole ratio maleic anhydride/diisobutylene copolymer is introduced until the total content of such salt is 6 to 6.5%, based on the calcium sulfate. The resulting dispersion has good flow and leveling and the additional property of a reversible thixotropic gel structure.

*Example 3*

To 100 parts of an aqueous dispersion of about 43% by weight of the same ethyl acrylate copolymer as is used in preceding examples, which contains about 3% of t-octylphenoxypolyethoxyethanol as an emulsifier, there are added 10 parts by weight of a 25% aqueous solution of the sodium salt of the 1:1 mole ratio maleic anhydride/diisobutylene copolymer and 20 parts by weight of a 10% solution in water of calcium chloride, both additions being made slowly with agitation. Upon the addition of the calcium chloride, a thixotropic gel forms which is reversible in character and has good flow and leveling when applied by brush or roller. The coatings obtained are substantially clear and resistant to scrubbing.

*Example 4*

To 100 parts of the same ethyl acrylate copolymer dispersion as that used in the preceding examples, one part by weight of 28% of ammonium hydroxide is added and then gradually there is added with stirring 10 parts by weight of a 25% aqueous solution of the same sodium salt of dissobutylene/maleic anhydride copolymer as is used in the preceding examples. Then 23.5 parts by weight of a 10% aqueous solution of barium chloride is added. The dispersion obtained is thixotropic in character and is lightly gelled. It has good flow and leveling when applied by brush and roller.

*Example 5*

To 100 parts by weight of a 51% polyvinyl acetate dispersion in water there are added 10 parts by weight of the same 25% sodium salt of maleic anhydride copolymer as is used in the preceding examples and 21 parts by weight of a 10% solution of calcium chloride in water. A light thixotropic gel forms which is reversible in character and provides excellent flow and leveling on application by brush and roller.

*Example 6*

To 100 parts of the same aqueous dispersion of ethyl acrylate as is used in Examples 1 to 4, there are added 10 parts by weight of the same 25% solution of the sodium salt of maleic anhydride copolymer and 33.3 parts of a 10% solution in water of the dihydrate of zinc acetate. Within ten minutes after the addition of the zinc acetate, a thixotropic gel is formed. This gel is reversible and the dispersion obtained has excellent flow and leveling on brush and roller application.

*Example 7*

One hundred and eighty parts of rutile TiO₂ is dispersed in a solution formed of a mixture of 15.6 parts of water and 45 parts of an aqueous solution containing 29% of sodium salt of a copolymer of about 60 parts by weight of ethyl acrylate with about 40 parts by weight of methacrylic acid having a viscosity average molecular weight of about 35,000. Then 140 parts by weight of the same 43% ethyl acrylate copolymer dispersion as is used in Examples 1 through 4 is added and mixed thoroughly. Then 40 parts by weight of a 10% aqueous solution of calcium chloride is added slowly with constant stirring and finally an additional 45 parts by weight of the 29% aqueous solution of the sodium salt of the ethyl acrylate/ methacrylic acid copolymer initially added to the rutile $TiO_2$ is mixed in. Upon the addition of the last salt, a thixotropic gel forms and the dispersion has good flow and leveling when applied by roller and brush.

Ninety parts of rutile $TiO_2$ are mixed with 40 parts by weight of a 10% aqueous solution of a sodium lignin sulfonate having a viscosity average molecular weight of 1000 to 2000. Then 70 parts by weight of the same 46% ethyl acrylate copolymer dispersion as is used in Examples 1 to 4 is added with continued mixing. Finally, 30 parts by weight of a 10% aqueous solution of calcium chloride is added slowly with constant agitation. A thixotropic gel of reversible character is formed. The dispersion exhibits good flow and leveling on application by brush and roller.

*Example 9*

To 300 parts by weight of the same 46% ethyl acrylate copolymer dispersion as is used in Examples 1 to 4, 45 parts by weight of an approximate 18% solution of the sodium salt of a condensation product of naphthalene-sulfonic acid with formaldehyde having a viscosity average molecular weight of about 1000. Thereafter about 12 parts of a 10% aqueous solution of calcium chloride is added slowly with mixing and finally three parts by weight of a 28% aqueous ammonia solution is added. A reversible thixotropic gel structure is obtained. The dispersion has good flow and leveling when applied by brush and roller.

*Example 10*

To 985 pounds of the formulation G of Example 1, 90 pounds of a 6.5% solution in water of calcium hydroxide is added gradually with stirring. Thereafter 22.5 pounds of an aqueous 10% solution of the same sodium salt of maleic anhydride/diisobutylene copolymer as is used in Examples 1 to 4 is added. The resulting water-base paint has a pH of 11.5 and a viscosity of 73 Krebs units. This aqueous base paint has excellent flow and leveling on application by either brush or roller and the films obtained have excellent scrub-resistance.

*Example 11*

There are mixed with agitation the following substances in the order and amounts named:

| | Parts by weight |
|---|---|
| Rutile $TiO_2$ | 90 |
| Polyanion solution [1] | 7.2 |
| Water | 25 |
| Aqueous polymer dispersion [2] | 70 |
| Aluminum sulfate | 7 |

[1] Sodium salt of 1:1 mole ratio copolymer of maleic anhydride and diisobutylene having a viscosity average molecular weight of 2000–4500 (25% solution in water).
[2] Aqueous dispersion of about 43% of a copolymer of about 66% ethyl acrylate, about 32.5% methyl methacrylate, and about 1.5% acrylic acid containing about 3% of t-octyl-phenoxypolyethoxyethanol and neutralized to a pH of 7.0 with $NH_4OH$.

The composition obtained has a stiff gel structure and is quite thixotropic. It has good flow and leveling properties when applied by brush and roller.

We claim:

1. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble salt of an addition copolymer of about 40 to about 60 mole percent of an $\alpha,\beta$-monoethylenically unsaturated carboxylic acid with at least one other monoethylenically unsaturated comonomer which normally would produce an insoluble homopolymer, the copolymer having a viscosity-average molecular weight of 350 to 35,000 and (2) polyvalent metal cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

2. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble sodium salt of a copolymer of 40 to 60 mole percent of maleic anhydride with diisobutylene having a viscosity-average molecular weight of 350 to 35,000, and (2) calcium cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

3. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble ammonium salt of a copolymer of 40 to 60 mole percent of maleic anhydride with diisobutylene having a viscosity-average molecular weight of 350 to 35,000, and (2) calcium cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

4. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble sodium salt of a copolymer of 40 to 60 mole percent of maleic anhydride with diisobutylene having a viscosity-average molecular weight of 350 to 35,000, and (2) zinc cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

5. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble salt of an addition copolymer, having a viscosity average molecular weight of 350 to 35,000, of 40 to 60 mole percent of methacrylic acid with an ester of an acid having the formula

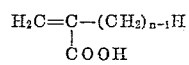

in which $n$ is an integer having a value of 1 to 2, with an alcohol having 1 to 18 carbon atoms, and (2) calcium cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

6. A composition comprising an aqueous dispersion of a water-insoluble synthetic linear addition polymeric material, said aqueous dispersion containing 10 to 60% by weight of said polymeric material, said polymeric material being a polymer obtained by vinyl polymerization of monoethylenically unsaturated molecules, and a thickening agent which is the salt of (1) the polyanions of a water-soluble sodium salt of an addition copolymer, having a viscosity-average molecular weight of 350 to 35,000, of 40 to 60 mole percent of methacrylic acid with ethyl acrylate, and (2) calcium cations, the amount of the water-soluble salt being in the range of ½% to 10% of the weight of the aqueous phase, and the amount of the cations being from about one-fifth to two and one-half times the equivalent weight of the polyanions, and an emulsifier selected from the group consisting of anionic and non-ionic emulsifiers.

References Cited in the file of this patent

UNITED STATES PATENTS

| | | |
|---|---|---|
| 1,976,679 | Fikentscher et al. | Oct. 9, 1934 |
| 2,343,093 | Smith | Feb. 29, 1944 |
| 2,343,095 | Smith | Feb. 29, 1944 |
| 2,530,770 | Hopperstead | Nov. 21, 1950 |
| 2,725,321 | Martello | Nov. 29, 1955 |
| 2,875,166 | Hopkins | Feb. 24, 1959 |

FOREIGN PATENTS

| | | |
|---|---|---|
| 717,971 | Great Britain | Nov. 3, 1954 |